(12) United States Patent
Inoue et al.

(10) Patent No.: US 10,775,657 B2
(45) Date of Patent: Sep. 15, 2020

(54) TRANSPARENT SUBSTRATE AND DISPLAY DEVICE

(71) Applicant: AGC Inc., Chiyoda-ku (JP)

(72) Inventors: Yasuhiro Inoue, Chiyoda-ku (JP); Atsushi Inoue, Chiyoda-ku (JP); Ryou Hokari, Chiyoda-ku (JP); Kensuke Fujii, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 56 days.

(21) Appl. No.: 16/142,218

(22) Filed: Sep. 26, 2018

(65) Prior Publication Data

US 2019/0101787 A1     Apr. 4, 2019

(30) Foreign Application Priority Data

Oct. 2, 2017 (JP) .................. 2017-192590

(51) Int. Cl.
| | | |
|---|---|---|
| *G06F 1/16* | (2006.01) | |
| *G02F 1/1333* | (2006.01) | |
| *B32B 17/00* | (2006.01) | |
| *C03C 15/00* | (2006.01) | |
| *C03C 3/083* | (2006.01) | |
| *B60R 11/00* | (2006.01) | |
| *B60R 11/02* | (2006.01) | |

(52) U.S. Cl.
CPC ........ *G02F 1/133308* (2013.01); *B32B 17/00* (2013.01); *C03C 15/00* (2013.01); *B60R 11/00* (2013.01); *B60R 11/0235* (2013.01); *B60R 2011/0012* (2013.01); *C03C 3/083* (2013.01); *G02F 2001/133331* (2013.01); *G02F 2201/503* (2013.01); *G06F 1/16* (2013.01)

(58) Field of Classification Search
None
See application file for complete search history.

(56) References Cited

U.S. PATENT DOCUMENTS

| | | | | |
|---|---|---|---|---|
| 8,535,473 | B2* | 9/2013 | Dietz | ................. C09J 7/35 |
| | | | | 156/275.5 |
| 9,335,574 | B2* | 5/2016 | Lee | ................. G02F 1/1333 |
| 9,500,890 | B2* | 11/2016 | Kim | ................. H01L 27/1266 |
| 9,655,258 | B2* | 5/2017 | Lee | ................. G02F 1/1333 |
| 9,684,209 | B2* | 6/2017 | Yu | ................. G02F 1/1339 |
| 10,014,177 | B2* | 7/2018 | Bellman | ............. H01L 21/7007 |

(Continued)

FOREIGN PATENT DOCUMENTS

WO       WO 2011/148990 A1      12/2011

*Primary Examiner* — Courtney L Smith
*Assistant Examiner* — Rashen E Morrison
(74) *Attorney, Agent, or Firm* — Oblon, McClelland, Maier & Neustadt, L.L.P.

(57) ABSTRACT

A transparent substrate includes a first principal surface; a second principal surface as a principal surface on the opposite side of the first principal surface; a lateral surface extending between the first principal surface and the second principal surface; and a first boundary surface disposed between the first principal surface and the lateral surface and having a plurality of concave portions; wherein the first boundary surface is configured such that each of the concave portions has a bottom with a curvature and that the frequency of a maximum curvature is less than 3% in a frequency distribution of the curvatures of the concave portions.

20 Claims, 8 Drawing Sheets

(56) References Cited

U.S. PATENT DOCUMENTS

| | | | | |
|---|---|---|---|---|
| 2005/0191485 A1* | 9/2005 | Kitano | ................... | C09J 133/06 |
| | | | | 428/343 |
| 2012/0092585 A1* | 4/2012 | Byeon | ............... | G02F 1/133308 |
| | | | | 349/58 |
| 2012/0202030 A1* | 8/2012 | Kondo | ...................... | C03C 8/24 |
| | | | | 428/215 |
| 2014/0036338 A1* | 2/2014 | Bareman | ................. | G02F 1/157 |
| | | | | 359/267 |
| 2015/0110991 A1* | 4/2015 | Miwa | ................... | C03B 33/091 |
| | | | | 428/77 |
| 2016/0282527 A1* | 9/2016 | Saito | ..................... | C03B 33/091 |
| 2019/0134940 A1* | 5/2019 | Inoue | ............... | B32B 17/10082 |

* cited by examiner

TRANSPARENT SUBSTRATE AND DISPLAY DEVICE

TECHNICAL FIELD

The present invention relates to a transparent substrate and a display device.

BACKGROUND ART

In display devices, a cover member has been used to protect a display panel, such as a liquid crystal panel (see Patent Document 1 listed below, for example).

A vehicle, such as an automobile, has an onboard display device, such as a car navigation system, disposed thereon. The car navigation system is usually used by a passenger sitting on a front sheet (driver's seat or passenger seat) in such a state that the car navigation system is vertically disposed on an external side of a dashboard or embedded in a dashboard.

Recently, an onboard display device for a rear seat, specifically a rear seat entertainment (RSE) system for having a passenger on a rear seat watching an image or the like, has spread. The RSE system has been used, being usually disposed to a rear side of a front seat.

Even the latter type of onboard display device has a cover member disposed thereon from the viewpoint of protection of the display panel. As the cover member, a cover member made of glass, not a cover member made of a film, has been recently desired to be used from the viewpoint of texture.

PRIOR ART DOCUMENTS

Patent Documents

Patent Document 1: WO-A-2011-148990

DISCLOSURE OF INVENTION

Technical Problem

The transparent substrate, which is made of glass and is used as a cover member for an onboard display device, is required from the viewpoint of safety to have such a high impact resistance that the transparent member is prevented from being cracked even if a passenger hits his or her head against the transparent substrate in case of a traffic accident, such as an automobile crash.

In the case of, in particular, an onboard display device for a rear seat, such as an RSE system, a passenger could hit his or her head against an edge portion of the cover member from an oblique direction, not a perpendicular direction, with respect to a principal surface of the cover member to make the cover member cracked, starting at the edge portion in case of a traffic accident.

It is an object of the present invention to provide a transparent substrate having an excellent edge portion impact resistance against impact to its edge portion from an oblique slant direction, and a display device using the transparent substrate.

Solution to Problem

The present inventors have reviewed the impact resistance at an edge portion against impact from an oblique direction. As a result, the inventors have found that the object is achieved by using a specific transparent member as the cover member, thereby completing the present invention.

The present invention provides the following modes 1 to 14:

1. A transparent substrate including a first principal surface, a second principal surface as a principal surface on the opposite side of the first principal surface, a lateral surface extending between the first principal surface and the second principal surface, and a first boundary surface disposed between the first principal surface and the lateral surface and having a plurality of concave portions, wherein the first boundary surface is configured such that each of the concave portions has a bottom with a curvature and that a frequency of a maximum curvature is less than 3% in a frequency distribution of the curvatures of the concave portions.

2. The transparent substrate recited in item 1, wherein the first boundary surface is configured such that the difference between a maximum frequency and an intermediate frequency is 1% or more in the frequency distribution of the curvatures of the concave portions.

3. The transparent substrate recited in item 1 or 2, wherein the first boundary surface has an arithmetic average roughness $Ra_1$ of 3 to 10 μm.

4. The transparent substrate recited in any one of items 1 to 3, wherein the first boundary surface is configured such that the maximum frequency has a curvature of $1 \times 10^{-5}$ to $9.5 \times 10^{-5}$ $nm^{-1}$ in the frequency distribution of the curvatures of the concave portions.

5. The transparent substrate recited in any one of items 1 to 4, further including a third boundary surface disposed between the second principal surface and the lateral surface and having a plurality of concave portions, wherein the third boundary surface is configured such that the difference between a maximum frequency and an intermediate frequency is at least 1% in the frequency distribution of the curvatures of the concave portions.

6. The transparent substrate recited in item 5, wherein the third boundary surface has an arithmetic average roughness $Ra_3$ of 3 to 10 μm.

7. The transparent substrate recited in item 5 or 6, wherein the third boundary surface is configured such that the maximum frequency has a curvature of $1 \times 10^{-5}$ to $9.5 \times 10^{-5}$ $nm^{-1}$ in the frequency distribution of the curvatures of the concave portions.

8. The transparent substrate recited in any one of items 1 to 7, further including a second boundary surface disposed between the first principal surface and the first boundary surface, wherein the arithmetic average roughness $Ra_2$ of the second boundary surface is smaller than the arithmetic average roughness $Ra_1$ of the first boundary surface.

9. The transparent substrate recited in item 8, wherein the arithmetic average roughness $Ra_2$ of the second boundary surface is 0.02 to 0.15 μm.

10. The transparent substrate recited in item 8 or 9, wherein the first principal surface is apart from a junction between the first boundary surface and the second boundary surface by a distance $h_1$ of longer than 0 μm and not longer than 80 μm in a thickness direction of the transparent substrate.

11. The transparent substrate recited in any one of items 1 to 10, further including a fourth boundary surface disposed between the second principal surface and the third boundary surface, wherein the arithmetic average roughness $Ra_4$ of the fourth boundary surface is smaller than the arithmetic average roughness $Ra_3$ of the third boundary surface.

12. The transparent substrate recited in item 11, wherein the arithmetic average roughness $Ra_4$ of the fourth boundary surface is 0.02 to 0.15 μm.

13. The transparent substrate recited in item 11 or 12, wherein the second principal surface is apart from a joint between the third boundary surface and the fourth boundary surface by a distance $h_2$ of longer than 0 μm and not longer than 80 μm in the thickness direction of the transparent substrate.

14. A display device including the transparent substrate recited in any one of items 1 to 13, a display panel covered by the transparent substrate, and a case for housing the display panel, wherein the transparent substrate is disposed in such a direction that the first principal surface confronts a display surface of the display panel.

Advantageous Effects of Invention

According to the present invention, there are provided a transparent substrate having an excellent edge portion impact resistance against impact to its edge portion from an oblique slant direction, and a display device using the transparent substrate.

DESCRIPTION OF EMBODIMENTS

Now, preferred embodiments of the present invention will be described with reference to the drawings. In the embodiments described below, explanation will be made about a case where the present invention is applied to a cover member to be disposed on a vehicle (an onboard display device).

It should be noted that the present invention is not limited to the embodiments described below. Various modifications and replacements may be made to the embodiments described below without departing from the spirit or scope of the present invention. For example, the present invention can be also applicable to a display device other than an onboard display device.

Each of the numerical ranges using the wording "to" means to include the numerical values written before and after the wording "to" as the lower limit and the upper limit.

The arithmetic average roughness (Ra) is a value measured according to JIS B 0601:2001.

[Onboard Display Device]

Figure 1:
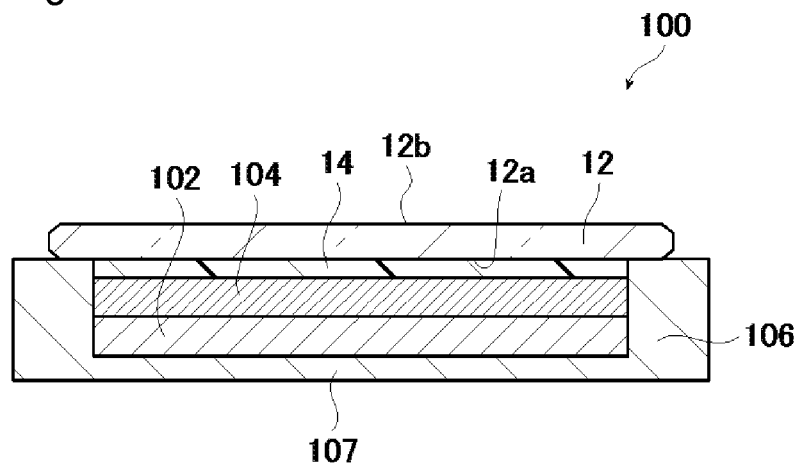
FIG. 1 is a schematic cross-sectional view illustrating the onboard display device according to an embodiment of the present invention.

FIG. 1 is a schematic cross-sectional view illustrating the onboard display device 100 according to an embodiment of the present invention.

In one example, the onboard display device 100 is a rear seat entertainment (RSE) system, which is used being disposed to a rear side of a front seat of an automobile.

The onboard display device 100 includes a case 106 for housing respective members. The case 106 has a backlight unit 102 disposed on a case bottom plate 107 thereof such that the backlight unit 102 has a display panel 104 disposed thereon. In one example, the display panel 104 is a liquid crystal panel. The case 106 has an opening formed therein.

There is no particular limitation to the structure of each of the backlight unit 102 and the display panel 104. A known structure is applicable to each of the backlight unit and the display panel. Likewise, there is no particular limitation to the material etc. of the case 106 (including the case bottom plate 107).

The onboard display device is not limited to one having a liquid crystal device as the display panel 104. The onboard display device may have, for example, an organic EL panel, a plasma display panel (PDP), or an electronic ink panel. The onboard display device may have, for example, a touch panel.

As illustrated in FIG. 1, the onboard display device has a transparent substrate 12 bonded to the display panel 104 by an adhesive layer 14. The transparent substrate 12 functions as a cover member for covering the display panel 104.

The transparent substrate 12 includes a pair of principal surfaces. Specifically, the transparent substrate includes a first principal surface 12a confronting (facing) the display panel 104, and a second principal surface 12b on the opposite side of the first principal surface 12a without confronting (facing) the display panel 104.

FIG. 1 illustrates a mode where the transparent substrate 12 has an edge portion exposed without being housed in the case 106. The present invention is not limited to the mode shown in FIG. 1. The present invention is also applicable, for example, to a mode where the transparent substrate 12 has an edge portion brought into contact with an inner wall surface of the case 106, or a mode where the transparent substrate 12 has an edge portion covered by the case 106.

The adhesive layer 14 is preferred to be transparent like the transparent substrate 12 and to have a small refractive index difference with respect to the transparent substrate 12. The adhesive layer 14 may be, for example, an OCA (Optical Clear Adhesive) film or tape, in addition to a layer made of a transparent resin obtainable by curing a liquid curable resin composition. The adhesive layer 14 has a thickness of 5 to 400 μm, for example, preferably 50 to 200 μm.

[Transparent Substrate]

<Principal Surface and Lateral Surface>

Figure 2:
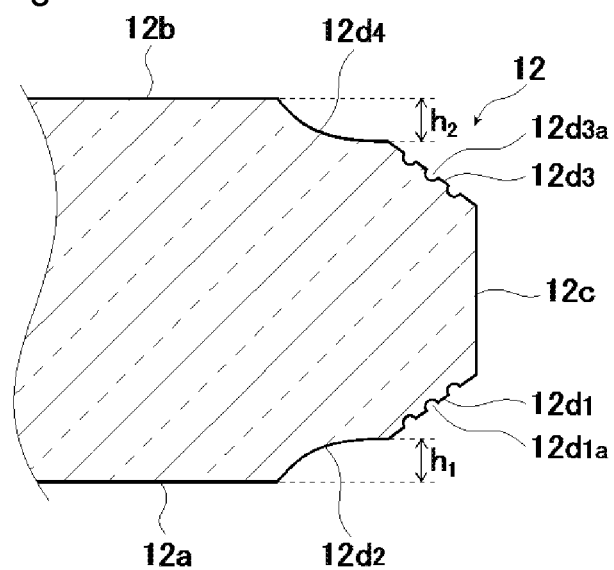
FIG. 2 is a schematic cross-sectional view illustrating the transparent substrate according to the embodiment of the present invention in enlargement.

FIG. 2 is a schematic cross-sectional view illustrating the transparent substrate 12 in enlargement. The transparent substrate 12 basically includes the first principal surface 12a, the second principal surface 12b and a lateral surface 12c extending between the first principal surface 12a and the second principal surface 12b. The lateral surface 12c is a surface substantially perpendicular to the first principal surface 12a and the second principal surface 12b and may have another surface, such as a boundary surface between the first principal surface 12a and the lateral surface 12c, or a boundary surface between the second principal surface 12b and the lateral surface 12c as described later.

<First Boundary Surface>

The transparent substrate 12 further includes a first boundary surface $12d_1$ disposed between the first principal surface 12a and the lateral surface 12c. The first boundary surface $12d_1$ includes a plurality of concave portions $12d_{1a}$. Each of the concave portions $12d_{1a}$ has a bottom with a curved surface.

The first boundary surface $12d_1$ is configured such that the frequency of a maximum curvature is less than 3% in a frequency distribution of the curvature of each of the concave portions. Thus, the transparent substrate 12 has an excellent impact resistance against impact to its edge portion from an oblique direction when being used as a cover member for the onboard display device 100. The presumed cause will be explained later. The frequency of the maximum curvature is preferably 2% or less, more preferably 1% or less, furthermore preferably 0.5% or less. The maximum curvature is $1.45 \times 10^{-4}$ nm$^{-1}$ in the embodiment as described later.

The radius of curvature and the curvature at the bottoms of the concave portions may be found by approximating each of the concave portions with a circle. The reciprocal (1/r) of a radius of curvature r is a curvature. From this point of view, when a concave portion has a great curvature (small radius of curvature) at the bottom, the concave portion is presumed to be sharp and nearly wedged in comparison with a case where the concave portion has a small curvature (large radius of curvature) at the bottom.

When something is hit against the transparent substrate 12 from an oblique direction, a great stress is generated in the first boundary surface $12d_1$. When the first boundary surface $12d_1$ has many sharp scratches thereon or many concave portions having a great curvature at the bottom, cracks are likely to be caused, starting at these scratches or concave portions.

The transparent substrate 12 according to this embodiment can reduce the starting points of cracking because the frequency of the maximum curvature (maximum value of the curvatures at the bottoms of the concave portions $12d_{1a}$ is lower than a certain value on the first boundary surface $12d_1$. For this reason, it is presumed that the transparent substrate 12 has an excellent edge portion impact resistance against impact to its edge portion from an oblique slant direction since the occurrence of cracking is minimized on the first boundary surface $12d_1$ of the transparent substrate 12 as described above.

The curvature (unit: nm$^{-1}$) at the bottom of each of the concave portions $12d_{1a}$ of the first boundary surface $12d_1$ may be found as follows:

First, a laser microscope (manufactured by KEYENCE CORPORATION under the product name of VK-9700) is used to measure the height (unit: nm) of the first boundary surface $12d_1$ having the concave portions $12d_{1a}$ (the measurement interval of the embodiment: 278 nm, the measuring range of the embodiment: 270 μm in an X direction and 270 μm in a Y direction).

The measured height data is numerically dealt with by secondary differentiation by using the method described below. The secondary differentiation may be performed by the Savitzky-Golay method. The data of fifteen points before each point and fifteen points after each point in the height data is approximated by using a cubic polynomial expression. With respect to each point, secondary differentiation is performed in the X direction and the Y direction to find the curvatures of each point, and the average value of the curvatures in the X direction and the curvatures in the Y direction at each point is determined as the curvature at that point.

Among the obtained curvatures, the value of the point where the slope is zero (or the point where the inclination changes from minus to plus), which is derived by numerical differentiation, was regarded as the curvature of the bottom part. The value of first derivative (differentiation) at each point may be also derived by Savitzky-Golay method. In this primary differentiation, the data of fifteen points before each point and fifteen points after each point is approximated by using a cubic polynomial expression.

It is preferred to perform proper smoothing processing because the data obtained by a laser microscope includes a short cycle of noises. The Savitzky-Golay method is advantageously used because of being a common method that performs smoothing and numerical differentiation simultaneously. The measuring range is selected so as to include sufficiently many concave portions in an adequate way.

Next, the frequency distribution (horizontal axis: curvature, vertical axis: frequency) of the curvatures at the bottoms of the concave portions $12d_{1a}$ of the first boundary surface $12d_1$, is found. The minimum value of the curvatures (minimum curvature) and the maximum value of the curvatures (maximum curvature) are found, and the curvature range from the minimum curvature to the maximum curvature is divided into thirty ranks. In other words, twenty-eight levels of curvature are set between the minimum curvature and the maximum curvature. Thus, the curvatures are classified into thirty curvatures. The minimum curvature is set as the first curvature, and the maximum curvature is set as the thirtieth curvature. When n is an integral number from 2 to 30, the curvatures between the (n−1)th curvature and the n-th curvature are determined as being included in the n-th curvature. The frequency distribution of totally thirty kinds of curvatures is found. Lastly, the frequency of the maximum curvature as the thirtieth curvature is found.

In this embodiment, the minimum value of the curvatures (minimum curvature) is set at $5 \times 10^{-10}$ nm$^{-1}$ while the maximum value of the curvatures (maximum curvature) is set at $1.45 \times 10^{-4}$ nm$^{-1}$. The curvatures out of the curvature range are not counted because of being not the measured values at the bottoms of the concave portions. Finally, the curvature range was divided into thirty levels, and the frequencies of the first to thirtieth curvature were found.

In order that the transparent substrate 12 has a more excellent edge portion impact resistance against impact from an oblique direction, the difference between a maximum frequency (maximum value of the frequencies) and an intermediate frequency (intermediate value of the frequencies) is preferably 1% or more in the frequency distribution of the curvatures at the bottoms of the concave portions $12d_{1a}$. This means that a peak indicative of the curvature having the maximum frequency arises in the frequency distribution (horizontal axis: curvature, vertical axis: frequency), and it is revealed that the curvatures at the bottoms are concentrated in a certain range. In order that the transparent substrate 12 has a furthermore excellent edge portion impact resistance against impact from an oblique direction, the difference between a maximum frequency and an intermediate frequency is preferably 2% or more, more preferably 3% or more.

In the frequency distribution of the curvatures at the bottoms of the concave portions $12d_{1a}$ of the first boundary surface $12d_1$, the curvature of the maximum frequency (maximum value of the frequencies) is preferably $1\times10^{-5}$ to $9.5\times10^{-5}$ nm$^{-1}$, more preferably $1\times10^{-5}$ to $7\times10^{-5}$ nm$^{-1}$.

In the frequency distribution of the curvatures at the bottoms of the concave portions $12d_{1a}$ of the first boundary surface $12d_1$, the curvatures have an average value of preferably $1\times10^{-5}$ to $7\times10^{-5}$ nm$^{-1}$, more preferably $2\times10^{-5}$ to $6\times10^{-5}$ nm$^{-1}$. When the average value of the curvatures is within the above-mentioned ranges, the transparent substrate 12 has an excellent edge portion impact resistance against impact to its edge portion t from an oblique slant direction.

The first boundary surface $12d_1$ has an arithmetic average roughness $Ra_1$ of preferably 3 to 10 μm, more preferably 5 to 10 μm.

The arithmetic average roughness (Ra) may be found by use of a probe or by image processing using a laser microscope. The arithmetic average roughness (Ra) is preferred to be measured by use of a laser microscope from the viewpoint of easy measurement and accurate measurement results.

In this embodiment, when the arithmetic average roughness (Ra) is measured by use of a probe, the probe is moved in a horizontal direction of a lateral surface (for example, a direction from a far side toward a near side or the opposite direction in FIG. 2).

In any one of the finding methods, the arithmetic average roughness (Ra) is measured with respect to a measure length of 1,000 μm.

<Second Boundary Surface>

The transparent substrate 12 may further include a second boundary surface $12d_2$ disposed between the first principal surface 12a and the first boundary surface $12d_1$.

Preferably, the arithmetic average roughness $Ra_2$ of the second boundary surface $12d_2$ is smaller than the arithmetic average roughness $Ra_1$ of the first boundary surface $12d_1$.

The second boundary surface $12d_2$ has an arithmetic average roughness $Ra_2$ of preferably 0.02 to 0.15 μm, more preferably 0.02 to 0.1 μm.

The arithmetic average roughness $Ra_2$ may be measured as in the arithmetic average roughness $Ra_1$.

The first principal surface 12a is apart from a junction between the first boundary surface $12d_1$ and the second boundary surface $12d_2$ by a distance $h_1$ of preferably more than 0 μm and 80 μm or less, more preferably more than 0 μm and 50 μm or less in a thickness direction of the transparent substrate 12.

The shape of the second boundary surface $12d_2$ is preferably a curved concave shape as shown in FIG. 2. The shape referred to here is a shape that is obtained by cutting the transparent substrate 12 in the thickness direction (vertical direction in FIG. 2) and viewing the transparent substrate 12 in section.

<Third Boundary Surface>

The transparent substrate 12 may include a third boundary surface $12d_3$ disposed between the second principal surface 12b and the lateral surface 12c. The third boundary surface $12d_3$ may include a plurality of concave portions $12d_{3a}$. With respect to the third boundary surface $12d_3$ as well, the frequency distribution of the curvatures at the bottoms of the concave portions $12d_{3a}$ is found as in the first boundary surface $12d_1$.

In the frequency distribution of the curvatures at the bottoms of the concave portions $12d_{3a}$ of the third boundary surface $12d_3$, the difference between a maximum frequency (maximum value of the frequencies) and an intermediate frequency (intermediate value of the frequencies) is preferably 1% or more. From the viewpoint of providing the transparent substrate 12 with a better appearance, for example, from the viewpoint of making the third boundary surface $12d_3$ transparent, the difference in the frequency distribution is preferably 2% or more, more preferably 3% or more.

In the frequency distribution of the curvatures at the bottoms of the concave portions $12d_{3a}$, the curvature of the maximum frequency (maximum value of the frequencies) is preferably $1\times10^{-5}$ to $9.5\times10^{-5}$ nm$^{-1}$, more preferably $1\times10^{-5}$ to $7\times10^{-5}$ nm$^{-1}$.

In the frequency distribution of the curvatures at the bottoms of the concave portions $12d_{3a}$ of the third boundary surface $12d_3$, the curvature has an average value of preferably $1\times10^{-5}$ to $7\times10^{-5}$ nm$^{-1}$, more preferably $2\times10^{-5}$ to $6\times10^{-5}$ nm$^{-1}$. As long as the average value of the curvatures is within the above-mentioned ranges, it is possible to provide the transparent substrate 12 with a better appearance.

The third boundary surface $12d_3$ has an arithmetic average roughness $Ra_3$ of preferably 3 to 10 μm, more preferably 5 to 10 μm.

The arithmetic average roughness $Ra_3$ may be measured as in the arithmetic average roughness $Ra_1$.

<Fourth Boundary Surface>

The transparent substrate 12 may further include a fourth boundary surface $12d_4$ disposed between the second principal surface 12b and the third boundary surface $12d_3$.

Preferably, the arithmetic average roughness $Ra_4$ of the fourth boundary surface $12d_4$ is smaller than the arithmetic average roughness $Ra_3$ of the third boundary surface $12d_3$.

The arithmetic average roughness $Ra_4$ of the fourth boundary surface $12d_4$ is preferably 0.02 to 0.15 μm, more preferably 0.02 to 0.1 μm.

The arithmetic average roughness $Ra_4$ may be measured as in the arithmetic average roughness $Ra_1$.

The preferred range of a distance $h_2$ from the second principal surface 12b to a joint between the third boundary surface $12d_3$ and the fourth boundary surface $12d_4$ is the same as the above-mentioned distance $h_1$.

The shape of the fourth boundary surface $12d_4$ is preferred to be a curved concave shape as in the second boundary surface $12d_2$ as shown in FIG. 2.

<Thickness, Size, Shape, etc. of Transparent Substrate>

The transparent substrate 12 has a thickness of preferably 0.5 to 2.5 mm, more preferably 0.7 to 2 mm, furthermore preferably 1.3 to 2 mm because the first principal surface 12a is provided with an improved durability against bending fracture.

The outer shape and the size of the transparent substrate 12 may be properly determined in conformity with the external shape of an onboard display device. The onboard display device is usually formed in a quadrangular shape, such as a rectangular shape, in external shape. In such a case, the outer shape of the transparent substrate 12 is rectangular. The transparent substrate may be formed in a shape including a curved outer shape so as to cover the entire display surface of a display panel, depending on the outer shape of an onboard display device.

In one example, when the transparent substrate 12 is formed in a quadrangular shape, the transparent substrate has dimensions of 100 to 900 mm in a longitudinal direction and 40 to 500 mm in a transverse direction, preferably 100 to 800 mm in the longitudinal direction and 40 to 300 mm in the transverse direction.

Each of the first principal surface 12a and the second principal surface 12b of the transparent substrate 12 has an appropriate size of 5 to 20 inches for example.

<Glass Plate (Strengthened Glass)>

Although there is no particular limitation to the transparent substrate 12, the transparent substrate is preferably made of a glass plate for example.

The glass plate is preferably made of strengthened glass. Typical examples of the strengthened glass include chemically strengthened glass and physically strengthened glass. Among them, chemically strengthened glass is preferred from the viewpoint of strength, design, cost and so on, and for the reason that the sharpness of fragments can be reduced.

The strengthened glass has a compressive stress layer formed in a surface layer thereof. The compress stress layer has a thickness (DOL or depth of layer) of preferably 10 μm or more, more preferably 15 μm or more, furthermore preferably 25 μm or more from the viewpoint of durability or the like against scratches.

The compressive stress layer of the strengthened glass has a surface compressive stress (CS) of preferably 500 MPa or more, more preferably 650 MPa or more, furthermore preferably 750 MPa or more. Although there is no particular limitation to the upper limit, the upper limit is 1,200 MPa or more, for example.

The compressive stress layer is preferred to be formed in a surface layer in each of the first principal surface 12a and the second principal surface 12b of the transparent substrate 12 as a glass plate. Further, the compressive stress layer is more preferred to be formed in a surface layer in each of the first boundary surface $12d_1$ and second boundary surface $12d_2$ as well.

The compressive stress layer may be also formed in a surface layer in each of the lateral surface 12c, the third boundary surface $12d_3$ and the fourth boundary surface $12d_4$.

The method for carrying out chemical tempering treatment to glass to prepare strengthened glass (chemically strengthened glass) may be typically a method for immersing glass in molten salt of $KNO_3$ to apply the glass to ion exchange treatment, followed by cooling the glass to a temperature close to room temperature. The treatment conditions, such as the temperature of molten salt of $KNO_3$, and an immersion time, may be set such that the surface compressive stress and the thickness of the compressive stress layer have desired values.

Examples of the glass include soda-lime glass and aluminosilicate glass ($SiO_2$—$Al_2O_3$—$Na_2O$-based glass). Among them, aluminosilicate glass is preferred from the viewpoint of strength.

The glass material may be, for example, a glass material containing 50 to 80% of $SiO_2$, 1 to 20% of $Al_2O_3$, 6 to 20% of $Na_2O$, 0 to 11% of $K_2O$, 0 to 15% of MgO, 0 to 6% of CaO and 0 to 5% of $ZrO_2$ in terms of mol %.

Chemically strengthened glass including aluminosilicate glass as the base component (for example, products commercially available under the trademark "Dragontrail" and manufactured by AGC Inc.) is also advantageously applicable.

<Functional Layer>

Preferably, the transparent substrate 12 has a functional layer formed in each of the first principal surface 12a and the second principal surface 12b or one of them. In this case, it is possible to watch a display image on the display panel 104 more clearly.

The functional layer may be formed by applying treatment to the surface layer of the transparent substrate 12 made of a glass plate or the like, or by being laminated as another layer on a surface or surfaces of the transparent substrate 12.

Examples of the functional layer include an antireflection layer, an antiglare layer (AG layer), an antifouling layer and a light-shielding layer.

<<Antireflection Layer>>

When the transparent substrate 12 has an antireflection layer formed on the second principal surface 12b, the display panel 104 can provide a clear display image.

There is no particular limitation to the material of the antireflection layer. Various kinds of materials are applicable so long as reflection of light is reduced. For example, a structure with a high-refractive index layer and a low-refractive index layer being laminated is also applicable. In Description, the high-refractive index layer is a layer having a refractive index of 1.9 or more with respect to light having a wavelength of 550 nm while the low-refractive index layer is a layer having a refractive index of 1.6 or less with respect to light having a wavelength of 550 nm.

The laminated structure may include a single high-refractive index layer and a single low-refractive index layer. The laminated structure may include at least two high-refractive index layers and at least two low-refractive index layers. When the laminated structure includes at least two high-refractive index layers and at least two low-refractive index layers, the high-refractive index layers and the low-refractive index layers are preferably alternately laminated.

There is no particular limitations to the materials of the high-refractive index and the low-refractive index layer. These materials may be selected, taking a required degree of antireflection and productivity or the like into consideration.

As the material forming the high-refractive index layer, a material including at least one kind selected from a group of niobium, titanium, zirconium, tantalum and silicon may be advantageously applicable, for example. Specifically, a niobium oxide ($Nb_2O_5$), a titanium oxide ($TiO_2$), a zirconium oxide ($ZrO_2$), a tantalum oxide ($Ta_2O_5$), a silicon nitride or the like are listed.

As the material forming the low-refractive index layer, a material containing silicon may be advantageously applicable, for example. Specifically, a silicon oxide ($SiO_2$), a material containing a mixed oxide of Si and Sn, a material containing a mixed oxide of Si and Zr, a material containing a mixed oxide of Si and Al or the like are listed.

There is no particular limitation to the method for depositing the antireflection layer. Various kinds of film deposition method are applicable. In particular, film deposition by use of pulse sputtering, AC sputtering, and digital sputtering or the like is preferred.

For example, when film deposition is performed by pulse sputtering, the film deposition may be performed by disposing a substrate of glass in a chamber having an atmosphere of a gaseous mixture of an inert gas and an oxygen gas and selecting a target so as to deposit a film having a desired composition on the substrate.

The antireflection layer has a film thickness of about 100 to about 300 nm for example.

<<AG Layer>>

When the transparent substrate 12 has an AG layer on the second principal surface 12b, it is possible to watch a display image clearly because the glare of external light is reduced when watching the display image on the display panel 104.

There is no particular limitation to the method for forming the AG layer. The method for forming the AG layer may be, for example, a method for etching a surface layer of the transparent substrate 12 or a method for applying a coating liquid containing fine particles and a matrix to a surface of the transparent substrate 12 and curing the matrix.

<<Antifouling Layer>>

The antifouling layer is also called an antifingerprint layer (AFP layer).

When the transparent substrate 12 has the antifouling layer disposed on the second principal surface 12b, it is possible to keep the second principal surface 12b of the transparent substrate 12 clean because no fingerprint is left on the second principal surface 12b even if the finger is brought into touch with the second principal surface 12b. For this reason, it is possible to clearly watch a display image on the display panel 104 when watching the display image.

When the antifouling layer includes a plurality of functional layers, the antifouling layer is preferred to be disposed on an outermost layer.

<<Light-Shielding Layer>>

The light-shielding layer is preferred to be disposed on the first principal surface 12a of the transparent substrate 12a. The provision of the light-shielding layer can conceal the wiring of the display panel 104 and a joint between the transparent substrate 12 and the display panel 104, providing the display device with a better appearance. The light-shielding layer may be disposed by using e.g. a screen printing method to apply a paint for printing to a peripheral edge of the first principal surface 12a of the transparent substrate 12 and drying the applied paint, for example.

[Method for Producing Transparent Substrate]

Now, the method for producing the above-mentioned transparent substrate 12 (hereinbelow, also referred to as "the production method" for the sake of convenience) will be described according to an embodiment of the present invention. A preferred mode of the production method includes at least a preparation process, a chamfering process, a film lamination process and an etching process described below in this order.

<Preparation Process>

Figure 3:
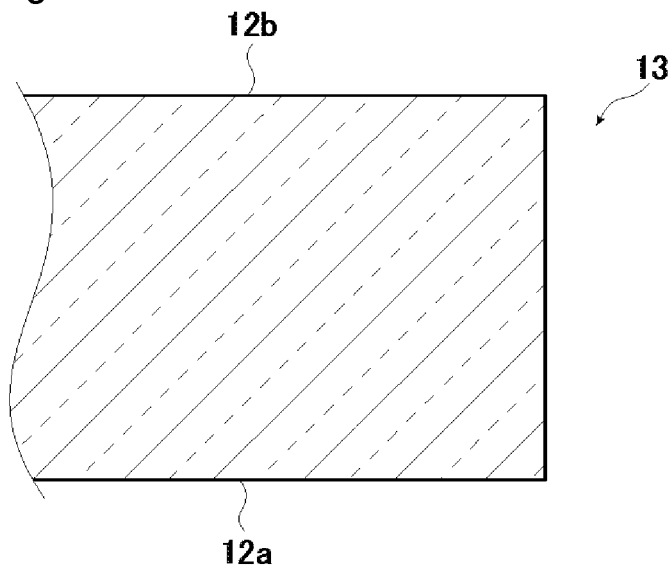
FIG. 3 is a schematic cross-sectional view illustrating an example of the preparation process according to an embodiment of the present invention in enlargement.

FIG. 3 is a schematic cross-sectional view illustrating an example of the preparation process according to the embodiment. The preparation process is a process for preparing raw glass 13 for the transparent substrate 12, such as a glass plate. The raw glass 13 is subjected to processing, such as chamfering, in a subsequent process to become the transparent substrate 12.

The raw glass 13 include a first principal surface 12a and a second principal surface 12b as in the transparent substrate 12. Each of the first principal surface 12a and the second principal surface 12b of the raw glass 13 has a larger size than that of the transparent substrate 12 because of being subjected to processing or the like in subsequent processes.

<Chamfering Process>

Figure 4:
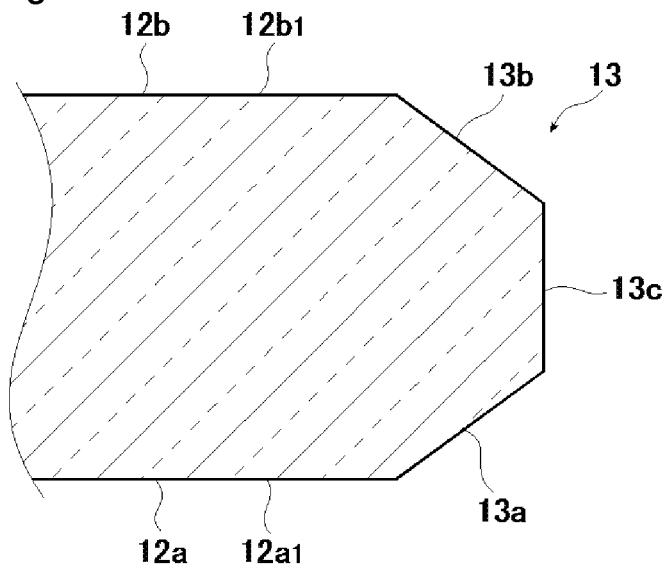
FIG. 4 is a schematic cross-sectional view illustrating an example of the chamfering process according to the embodiment of the present invention in enlargement.

FIG. 4 is a schematic cross-sectional view illustrating an example of a chamfering process according to the embodiment. The chamfering process is a process for chamfering an edge portion of the raw glass 13 to form a chamfered portion 13a at at least a position of the edge portion of the raw glass 13 close to the first principal surface 12a.

As illustrated in FIG. 4, the chamfering process is preferred to be a process for providing the raw glass 13 with the chamfered portion 13a and a chamfered portion 13b (chamfered portion close to the second principal surface 12b). Further, the raw glass preferably has an end surface 13c formed between the chamfered portion 13a and the chamfered portion 13b. Although there is no particular limitation to the shapes of the chamfered portion 13a, the chamfered portion 13b and the end surface 13c, these portions are preferred to be planar or substantially planar.

There is no particular limitation to the chamfering method. A conventional known method is applicable. For example, a grinding method using a grindstone is advantageously listed. As the grindstone, a rotary grindstone is applicable for example. In one example, the rotary grindstone has an annular grinding groove formed so as to extend in a circumferential direction, and the grinding groove includes abrasive grains made of alumina, silicon carbide, diamond or the like.

The chamfered portion 13a and the chamfered portion 13b are likely to have fine holes (scratches) formed thereon by chamfering. The raw glass 13 is also likely to be scratched on a peripheral edge portion $12a_1$ of the first principal surface 12a and a peripheral edge portion $12b_1$ of the second principal surface 12b. Although the scratches on the peripheral edge portion $12a_1$ and the peripheral edge portion $12b_1$ are mainly ones originally formed, the scratches could be deepened by chamfering in some cases.

In a mode of this embodiment illustrated in FIG. 4, the chamfered portion 13a and the chamfered portion 13b are formed to have a linear sectional shape between the first principal surface 12a and the lateral surface 13c and between the second principal surface 12b and the lateral surface 13c, being provided with so-called C-chamfering. The shape of the chamfered portions according to the present invention is not limited to C-chamfering. The shape may be a curved sectional shape between the first principal surface 12a and the lateral surface 13c and between the second principal surface 12b and the lateral surface 13c, being provided with R-chamfering. Further, the chamfered portion 13a is formed with so-called C-chamfering, and the chamfered portion 13b is formed with so-called R-chamfering, or vice versa.

<Film Lamination Process (mode 1)>

Figure 5:
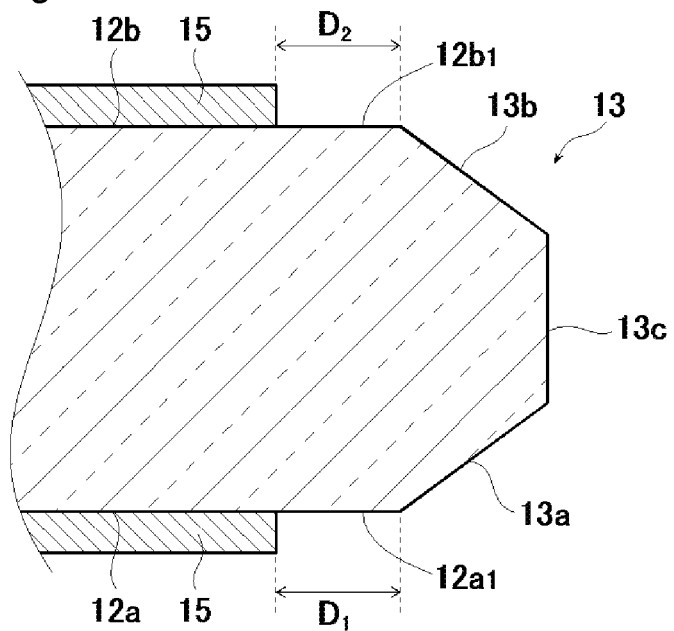
FIG. 5 is a schematic cross-sectional view illustrating an example of the film lamination process according to the embodiment of the present invention in enlargement.

FIG. 5 is a schematic cross-sectional view illustrating an example of the film lamination process according to the embodiment. The film lamination process is a process where a film 15 is laminated to the first principal surface 12a of the raw glass 13 with the chamfered portions 13a and 13b. The film 15 is laminated to the first principal surface 12a of the raw glass 13 so as to have its center aligned with the center of the first principal surface, for example.

The film 15 has a smaller area than the first principal surface 12a of the raw glass 13, for example. In this case, as shown in FIG. 5, the first principal surface 12a of the raw glass 13 has the peripheral edge portion $12a_1$ exposed after laminating the film 15.

The film 15 has an edge apart from a joint between the chamfered portion 13a and the first principal surface 12a of the raw glass 13 by a distance $D_1$ of preferably 0 μm or more and 1,000 μm or less, more preferably 0 μm or more and 500 μm or less.

As shown in FIG. 5, another film 15 is preferred to be laminated to the second principal surface 12b as well along with deposition for laminating the film 15 to the first principal surface 12a in the film laminating process.

The film 15 laminated to the second principal surface 12b has an edge apart from a joint between the chamfered portion 13b and the second principal surface 12b by a distance $D_2$, a preferred range of which is the same as the distance $D_1$.

In the following explanation, the distance $D_1$ and the distance $D_2$ will be also collectively called "offset amount" in some cases.

There is no limitation to the material forming the films 15 so long as they are masking films having a resistance against an etching solution described later (etching resistance). For example, a resin film, such as a polypropylene film, or polyethylene terephthalate (PET) film is preferred as the films 15. An adhesive agent may be applied to the films 15 for bonding with the raw glass 13.

<Film Lamination Process (mode 2)>

Figure 6:
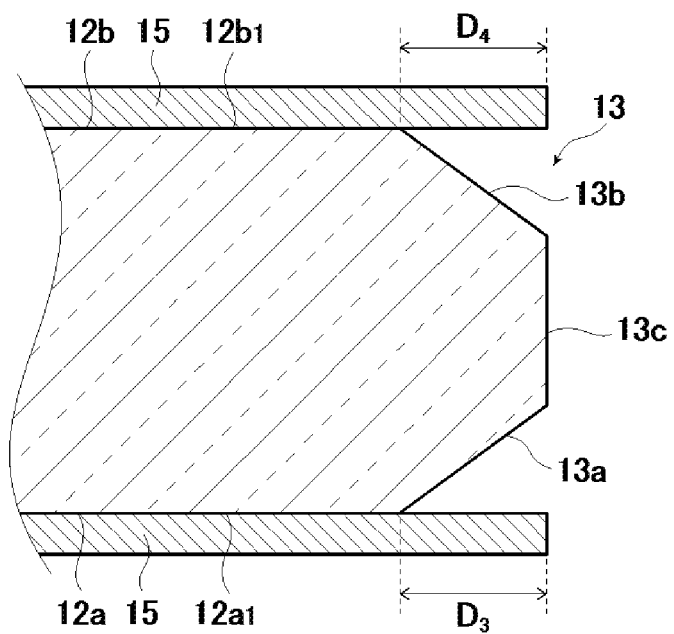
FIG. 6 is a schematic cross-sectional view illustrating another example of the film lamination process according to the embodiment of the present invention in enlargement.

FIG. 6 is a schematic cross-sectional view illustrating another example of the film lamination process according to the embodiment. Parts identical to the ones shown in FIG. 5 are indicated by like reference numerals, and explanation of those parts will be omitted.

The film 15 is not limited to the case in which it has a smaller area than the first principal surface 12a of the raw glass 13 (see FIG. 5). The film 15 may have the same area as or a larger area than the first principal surface 12a. In the latter case, the peripheral edge portion $12a_1$ of the first principal surface 12a of the raw glass 13 is covered with the film 15 without being exposed, shown in FIG. 6.

The film 15 has an edge apart from a joint between the chamfered portion 13a and the first principal surface 12a of the raw glass 13 by a distance $D_3$, which is preferably longer than 0 μm and not longer than 4,000 μm, more preferably longer than 0 μm and not longer than 3,000 μm.

Another film 15 is preferred to be laminated to the second principal surface 12b as well, as shown in FIG. 6. The film 15 laminated to the second principal surface 12b has an edge apart from a joint between the chamfered portion 13b and the second principal surface 12b by a distance $D_4$, a preferred range of which is the same as the distance $D_3$.

In the following explanation, the distance $D_3$ and the distance $D_4$ will be also collectively called "overhang amount" in some cases.

<Etching Process (Mode 1)>

Figure 7:
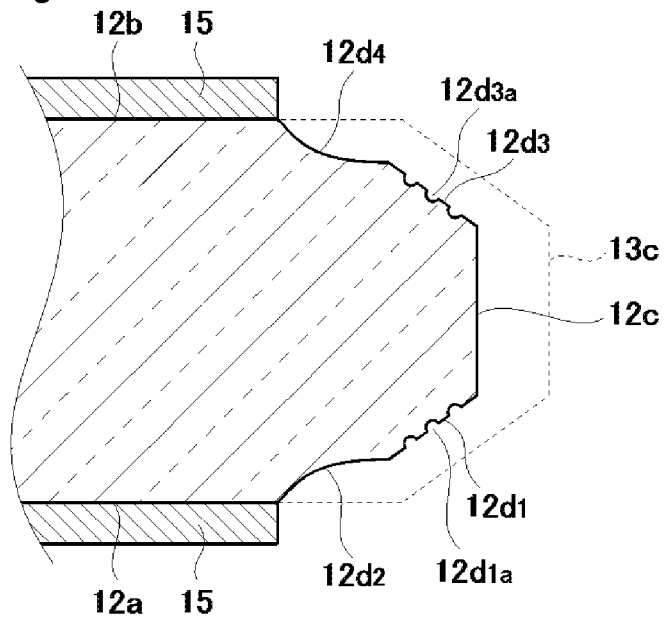
FIG. 7 is a schematic cross-sectional view illustrating an example of the etching process according to the embodiment of the present invention in enlargement.

FIG. 7 is a schematic cross-sectional view illustrating an example of the etching process according to the embodiment. The etching process shown in FIG. 7 is a process where the raw glass 13 with the peripheral edge portion $12a_1$ of the first principal surface 12a being exposed from the laminated film 15 (see FIG. 5) is immersed into the etching solution (not shown). Thus, a portion of the raw glass 13 not covered by the film 15 (exposed portion from the film 15) is etched to form a lateral surface 12c, a first boundary surface $12d_1$, a second boundary surface $12d_2$, a third boundary surface $12d_3$, and a fourth boundary surface $12d_4$.

In more detail, the chamfered portion 13a is etched to form the first boundary surface $12d_1$, and the exposed surface of the first principal surface 12a of the raw glass 13 from the film 15 (peripheral edge portion $12a_1$) is etched to form the second boundary surface $12d_2$.

Although holes (scratches) are formed at the chamfered portion 13a by chamfering as stated above, these holes are etched to be widened such that a plurality of concave portions $12d_{1a}$ with a curved bottom are formed at the first boundary surface $12d_1$.

In the etching process, likewise, the chamfered portion 13b is also etched to form the third boundary surface $12d_3$, and the exposed surface of the second principal surface 12b of the raw glass 13 from the film 15 (peripheral edge portion $12b_1$) is also etched to form the fourth boundary surface $12d_4$. The reason why the plurality of concave portions $12d_{3a}$ are formed at the third boundary surface $12d_3$ is the same as the one for the concave portions $12d_{1a}$.

Further, the end surface 13c is etched to form the lateral surface 12c.

There is no particular limitation to the kind of the etching solution so long as the etching solution can etch the transparent substrate 12. An etching solution containing hydrogen fluoride (HF) is advantageously listed. Such an etching solution may be, for example, mixed acid containing hydrogen chloride, and at least one kind of sulfuric acid, nitric acid, hydrochloric acid and fluorosilicic acid.

The etching amount is controlled by an immersion time to the etching solution. The concentration of hydrogen chloride in the etching solution may be changed, depending on the kind of glass or the etching amount.

In the etching process, two or more pieces of raw glasses 13 may be laminated and immersed in the etching solution. Thus, etching is effectively performed.

<Etching Process (Mode 2)>

Figure 8:
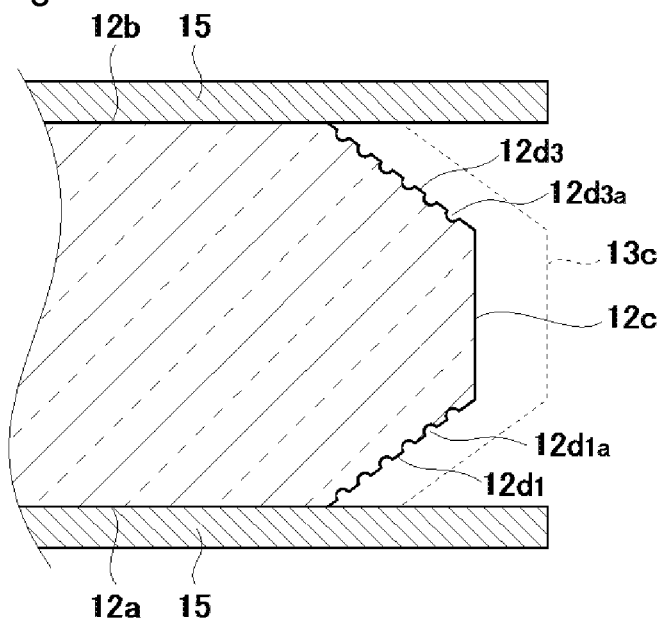
FIG. 8 is a schematic cross-sectional view illustrating another example of the etching process according to the embodiment of the present invention in enlargement.

FIG. 8 is a schematic cross-sectional view illustrating another example of the etching process according to the embodiment. Parts identical to those shown in FIG. 7 are indicated by like reference numerals and explanation of those parts will be omitted.

The etching process shown in FIG. 8 is a process where the raw glass 13 with the peripheral edge portion $12a_1$ of the first principal surface 12a being covered by the laminated film 15 (see FIG. 6) is immersed into the etching liquid (not shown). Thus, a portion of the raw glass 13 not covered by the film 15 (exposed portion of the raw glass from the film 15) is etched to form a lateral surface 12c, a first boundary surface $12d_1$ and a third boundary surface $12d_3$.

In more detail, the chamfered portion 13a is etched to form the first boundary surface $12d_1$. Although the chamfered portion 13a has holes (scratches) formed by chamfering as stated above, the holes are etched so as to be widened such that a plurality of concave portions $12d_{1a}$ having a curved bottom are formed at the first boundary surface $12d_1$.

Likewise, the chamfered portion 13b is etched to form the third boundary surface $12d_3$.

Further, the end surface 13c is etched to form the lateral surface 12c.

<Film Removal Process>

The production method is preferred to further include a process for removing the films 15 after the etching process. Thus, the first principal surface 12a and the second principal surface 12b, which have been covered with the films 15, are exposed.

<Tempering Process>

When the transparent substrate 12 is a glass plate, it is preferred to make the transparent substrate 12 strengthened glass by tempering treatment after the film removal process. As the tempering treatment, chemically tempering stated above is advantageously listed.

Even when the transparent substrate 12 as a glass plate is subjected to tempering treatment, such as chemically tempering, there is normally no change in the value of the arithmetic average roughness (Ra).

<Process for Disposing Functional Layer>

The production method may include a process for forming a functional layer on the first principal surface 12a or the second principal surface 12b of the transparent substrate 12, or each of both principal surfaces before the preparation process or the etching process. The presence of such a process allows the transparent substrate 12 to have a functional layer disposed thereon.

Even when the functional layer is disposed before the preparation process, the functional layer is protected from etching since the first principal surface 12a and the second principle surface 12b have the films laminated thereto as described above.

EXAMPLES

Now, the embodiments according to the present invention will be more specifically described in reference to Examples. It should be noted that the present invention is not limited to the following Examples. In the following Examples, Ex. 1 to 4 are Working Examples while Ex. 5 is a Comparative Example.

Ex. 1

As the raw glass 13 for the transparent substrate 12, a piece of aluminosilicate glass (manufactured by AGC Inc., product name: Dragontrail (trademark), dimensions: 250 mm×150 mm×2.0 mm) was prepared.

CNC (computer numeric control) grinding using a grindstone having a grit size of 600 was performed to an edge portion of the raw glass 13 to form the chamfered portion 13a and the chamfered portion 13b.

Paired films 15 which is made of a PET film (manufactured by Sumiron Co., Ltd., product name: TG-0330-12), were laminated to the first principal surface 12a and the second principal surface 12b of the chamfered raw glass 13. The films 15 used for laminating had a smaller area than the first principal surface 12a and the second principal surface 12b of the raw glass 13. The offset amount (distance $D_1$ and distance $D_2$) was set at 319 μm.

Next, the raw glass 13 with the films 15 laminated thereto was immersed in an etching solution (mixed solution of hydrogen fluoride and sulfuric acid, concentration of hydrogen fluoride: 2 mass %, concentration of sulfuric acid: 18 mass %) at 25° C. for 19 minutes to perform etching, forming the lateral surface 12c, the first boundary surface $12d_1$, the second boundary surface $12d_2$, the third boundary surface $12d_3$ and the fourth boundary surface $12d_4$.

After that, chemical tempering treatment is performed to the raw glass 13 with the films 15 being removed therefrom. The chemical tempering treatment was performed by immersing the entire raw glass 13 with the films 15 being removed therefrom, into molten salt of $KNO_3$ so as to have a thickness (DOL) of 35 μm and a surface compressive stress (CS) of 750 MPa in the compressive stress layer.

Thus, the transparent substrate 12 of Ex. 1 was obtained.

Ex. 2

The transparent substrate 12 of Ex. 2 was obtained in the same way as Ex. 1 except that the offset amount (distance $D_1$ and distance $D_2$) was set at 288 μm, and that the immersion time in the etching liquid was set at 12 minutes.

Ex. 3

The transparent substrate 12 of Ex. 3 was obtained in the same way as Ex. 1 except that the offset amount (distance $D_1$ and distance $D_2$) was set at 452 μm, and that the immersion time in the etching solution was set at 7 minutes.

Ex. 4

The transparent substrate 12 of Ex. 4 was obtained in the same way as Ex. 1 except that films 15, which had a larger area than each of the first principal surface 12a and the second principal surface 12b of the raw glass 13, were used, and that the overhang amount (distance $D_3$ and distance $D_2$) was set at 2,000 μm.

Ex. 5

The transparent substrate 12 of Ex. 5 was obtained in the same way as Ex. 1 except that the offset amount (distance $D_1$ and distance $D_2$) was set at 400 μm, and that the immersion time in the etching solution was set at 1 minute.

<Measurement of Surface Roughness>

In each of Ex. 1 to 5, the arithmetic average roughness $Ra_1$ of the first boundary surface $12d_1$, the arithmetic average roughness $Ra_2$ of the second boundary surface $12d_2$, the arithmetic average roughness $Ra_1$ of the third boundary surface $12d_3$ and the arithmetic average roughness $Ra_4$ of the fourth boundary surface $12d_4$ were measured.

The measurement are made by use of a laser microscope (manufactured by KEYENCE CORPORATION under the product name of VK-9700). Each arithmetic average roughness was measured under the condition of a measurement length of 1,000 μm.

<Measurement of Curvature at Bottom of Concave Portion>

In each of Ex. 1 to 5, the curvatures at the bottoms of the plural concave portions at the first boundary surface $12d_1$ and the third boundary surface $12d_3$ were measured by the following method.

A laser microscope (manufactured by KEYENCE CORPORATION under the product name of VK-9700) was used to measure the heights (unit: nm) of the first boundary surface $12d_1$ and the third boundary surface $13d_3$. The measuring range is 270 μm in the X direction and 270 μm in the Y direction. The measurement interval was set at 278 nm.

The measured height data is numerically subjected to secondary differentiation by using the method described below. The secondary differentiation was performed by the Savitzky-Golay method. The data of fifteen points before each point and fifteen points after each point in the height data is approximated by using a cubic polynomial expression. With respect to each point, secondary differentiation is performed in the X direction and the Y direction to find the curvatures of each point, and the average value of the curvatures in the X direction and the curvatures in the Y direction at each point is determined as the curvature at that point.

Among the obtained curvatures, the value of the point where the slope is zero (or the point where the inclination changes from minus to plus), which is derived by numerical differentiation, was regarded as the curvature of the bottom part. The value of first derivative (differentiation) at each point was also derived by Savitzky-Golay method, and the data of fifteen points before each point and fifteen points after each point is approximated by using a cubic polynomial expression.

Next, the frequency distributions (horizontal axis: curvature, vertical axis: frequency) of the curvatures at the bottoms of the concave portions $12d_{1a}$ of the first boundary surface $12d_1$ and the concave portions $12d_{3a}$ of the third boundary surface $12d_3$ were found.

In the Working Examples and the Comparative Example, the minimum value of the curvatures (minimum curvature) was set at $5\times10^{-10}$ $nm^{-1}$ while the maximum value of the curvatures (maximum curvature) was set at $1.45\times10^{-4}$ $nm^{-1}$. The curvatures out of the curvature range were not counted. The curvature range was divided into thirty ranks. The minimum curvature was set as the first curvature, and the maximum curvature was set as the thirtieth curvature. When n was an integral number from 2 to 30, the curvatures between the (n−1)th curvature and the n-th curvature were determined as being included in the n-th curvature. The frequency distribution of totally thirty kinds of curvatures was found.

Figure 12:
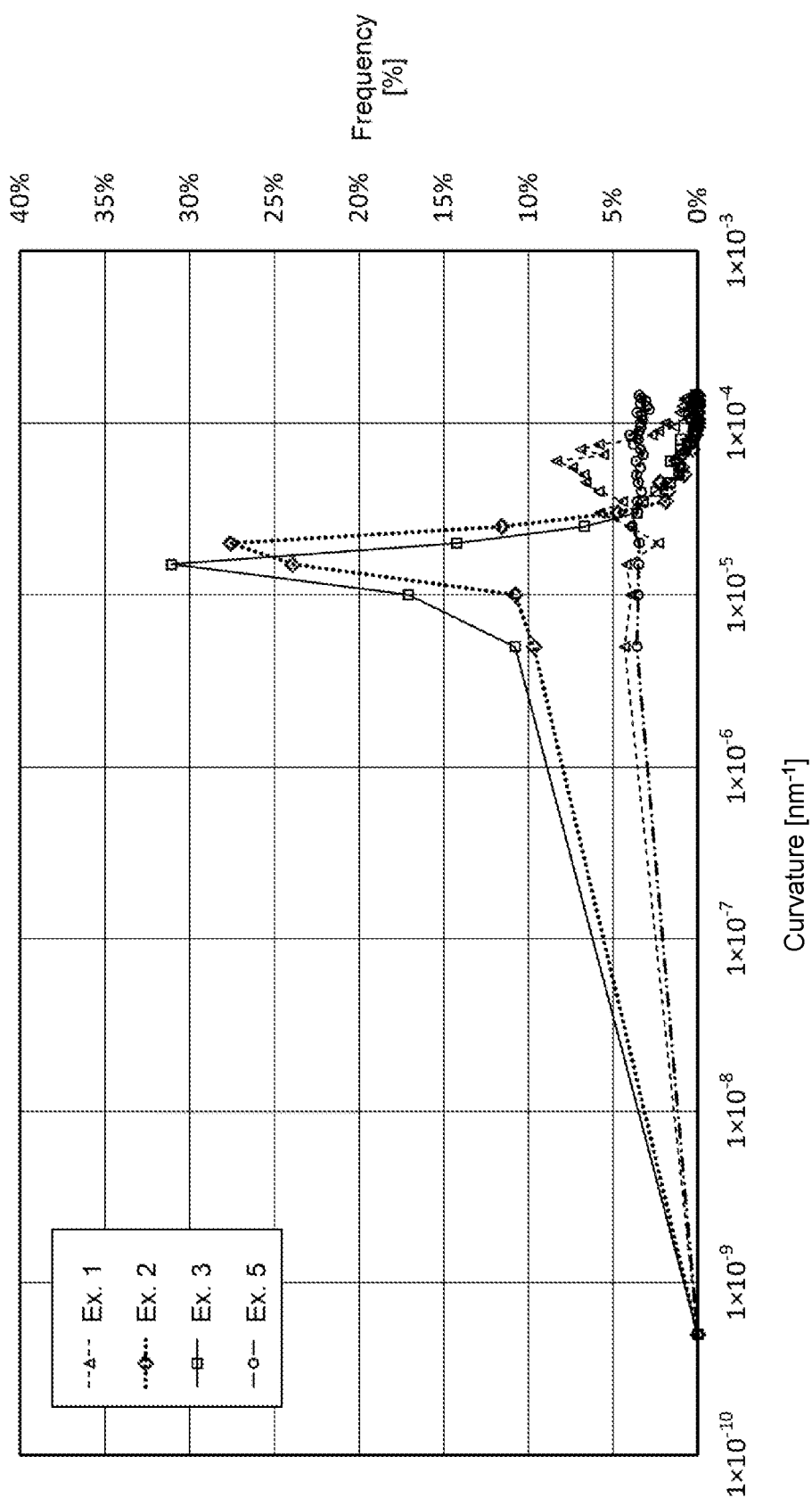
FIG. 12 is a graph illustrating the frequent distribution of the curvatures at the bottoms of the concave portions of the first boundary surface in each of Examples 1 to 3 and 5.

The results in the respective Working Examples and Comparative Example are shown in Table 1. Further, the frequency distribution of the curvatures at the bottoms of the concave portions $12d_{1a}$ of the first boundary surface $12d_1$ in each of Examples 1, 2, 3 and 5 is shown as a graph in FIG. 12. In the graphs in FIG. 12, lines connecting plots are shown for the sake of convenience and ease in understanding the differences between the graphs.

<Fabrication of Test Specimen>

In order to conduct a test for hitting a rigid model (also called "Head Impact Test") the transparent substrates 12 in the respective Examples were used as the cover members to fabricate test specimens 200 for the onboard display device.

Figure 9:
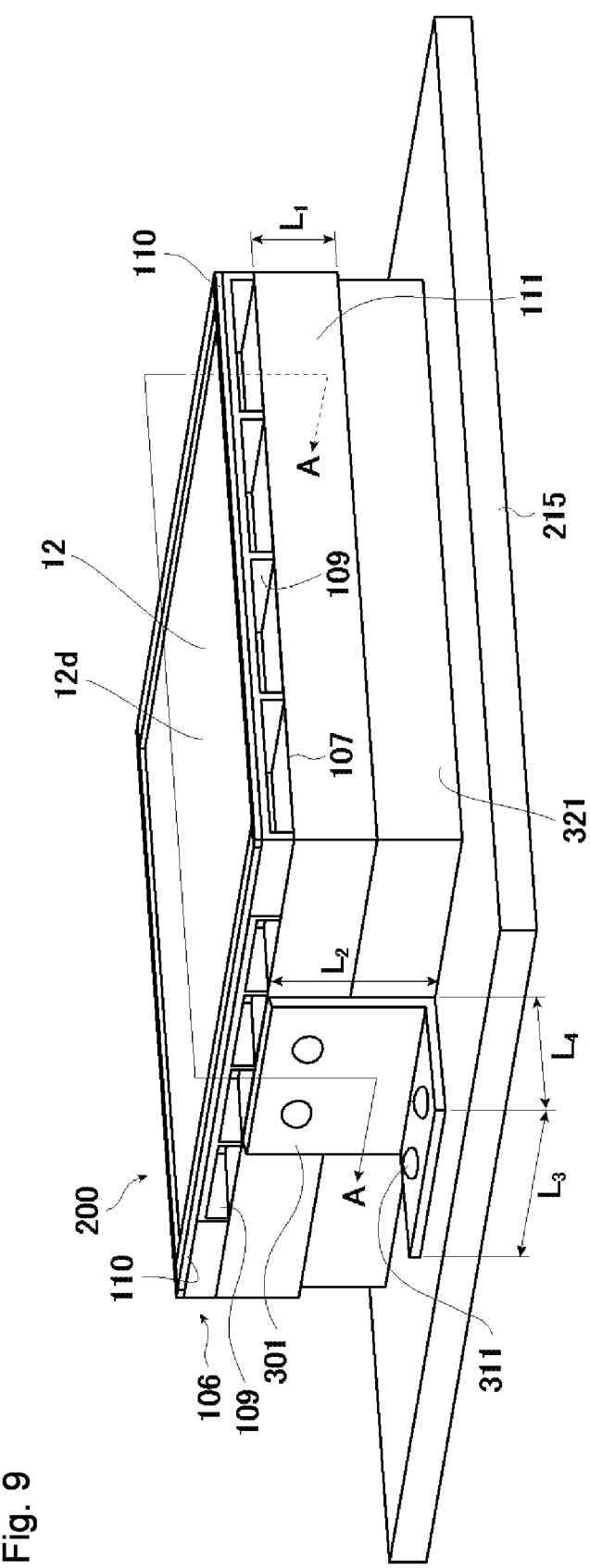
FIG. 9 is a perspective view illustrating a test specimen.
Figure 10:
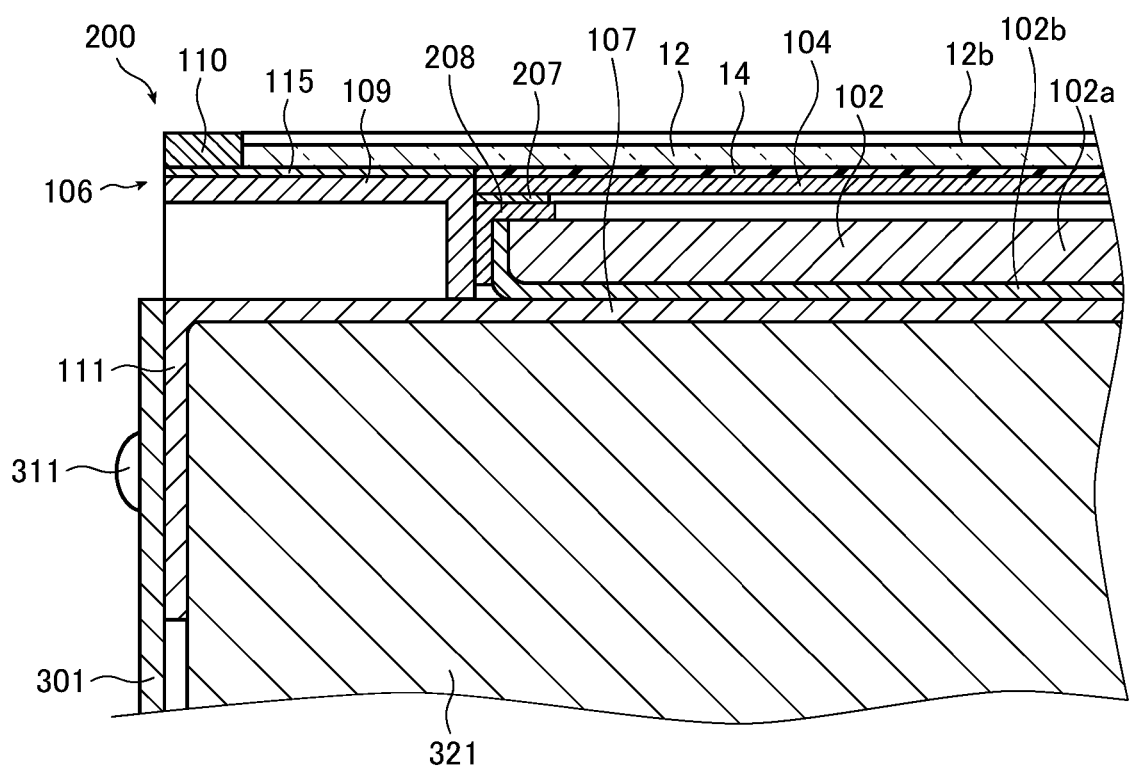
FIG. 10 is a cross-sectional view taken along line A-A of FIG. 9.
Figure 11:
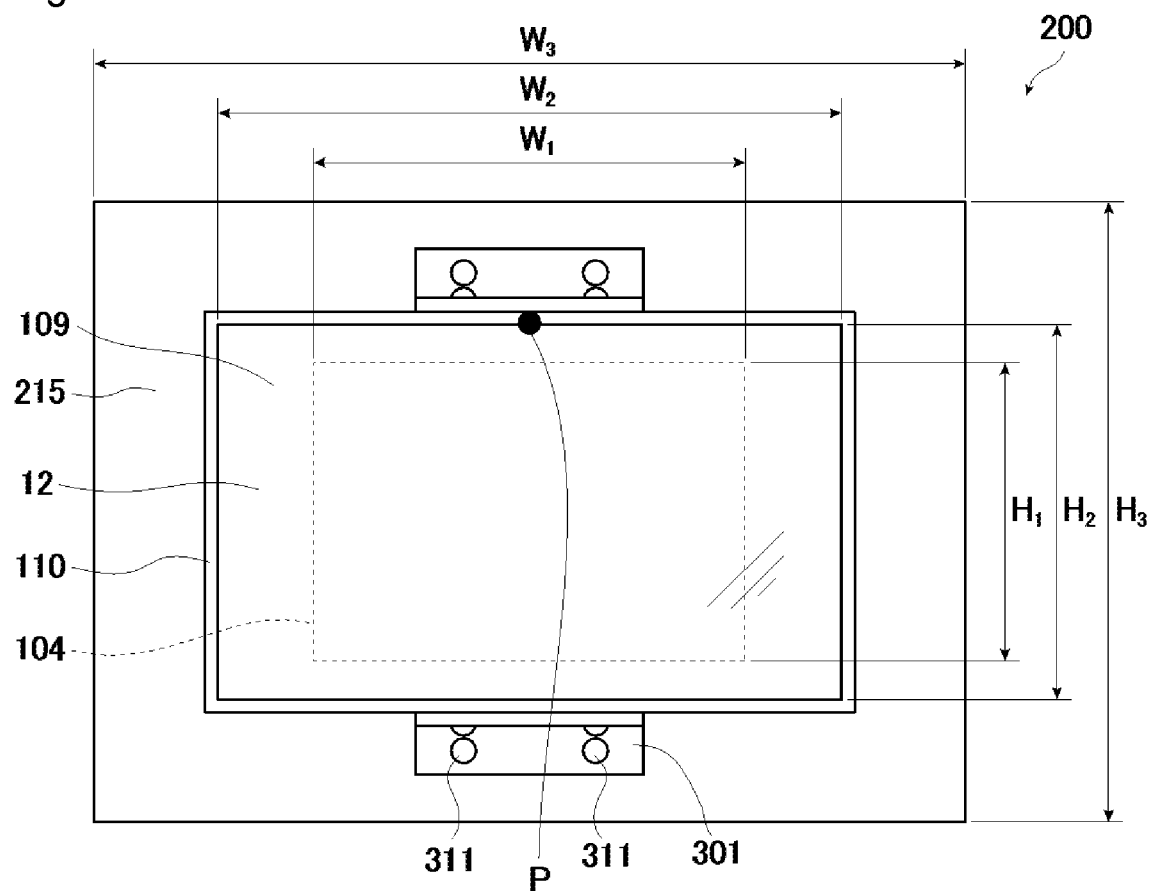
FIG. 11 is a plan view illustrating the test specimen.

The test specimens 200 will be explained in reference to FIGS. 9 to 11. In FIGS. 9 to 11, parts identical to (or corresponding to) those of the onboard display device 100 shown in FIG. 1 are indicated by like reference numerals, and explanation of those parts will be omitted in some cases.

FIG. 9 is a perspective view illustrating a test specimen 200. FIG. 10 is a cross-sectional view taken along line A-A of FIG. 9. FIG. 11 is a plan view illustrating the test specimen 200.

As shown in FIGS. 9 and 10, each of the test specimens 200 includes a case bottom plate 107, and on a peripheral edge portion of the case bottom plate 107 four case frames 109 with ribs therein are disposed. The case bottom plate 107 and the four case frames 109 form a case 106 having a quadrangular concave portion in a central area, and the case 106 has a backlight unit 102 and a display panel 104 disposed therein.

As shown in FIG. 10, the backlight unit 102 has an edge portion on a top side covered with an L-shaped member 208 having an L-shaped section. The L-shaped member 208 has a top surface bonded to an edge portion of a bottom surface of the display panel 104 by a double-sided tape 207. For this reason, between the display panel 104 and the backlight unit 102 is an air gap (having a thickness of 1.5 mm), which corresponds to the thicknesses of the L-shaped member 208 and the double-sided tape 207. The adhesive layer 14 is bonded on a top surface of the display panel 104. The transparent substrate 12 has the first principal surface 12a bonded to top surfaces of the case frames 109 by a double-sided tape 115. The case edge frames 110 are disposed on the top surfaces outside edge surfaces of the transparent substrate 12 and on the case frames 109. The case edge frames 110 are also bonded to the case frames 109 by the double-sided tapes 115.

As shown in FIGS. 9 and 10, the case bottom plate 107 has case projections 111 in a plate shape disposed on four sides so as to be continuous to the case bottom plate 107. The case bottom plate 107 and the four case projections 111 form a concave portion on a rear side of the case bottom plate 107 (on the opposite side of the backlight unit 102). A part of a cushion member 321 is housed in the concave portion. The cushion member 321 is disposed on a planar supporting plate 215, and the case 106 is supported by the cushion member 321. The used cushion member 321 was two-ply sheets of "CF45" (having a thickness of 25.4 mm) manufactured by K.C.C. SHOKAI Co., LTD which is commercially available. Each of paired opposite case projections 111 has one end of a fixing member 301 coupled thereto by bolts 311 with the case 106 being supported by the cushion member 311. Each fixing member 301 has the other end coupled to the support member 215 by bolts 311. Thus, the case 106 including the case projections 111 is positioned and fixed by the fixing members 301.

With respect to the fixing members 301, which are plate members having an L-shaped section, the sizes indicated by references $L_1$ to $L_4$ in FIG. 9 were set at 20 mm for $L_1$, 50 mm for $L_2$, 100 mm for $L_3$ and 20 mm for $L_4$.

The sizes indicated by references $H_1$ to $H_3$ and $W_1$ to $W_3$ in FIG. 11 were set at 120 mm for $H_1$, 150 mm for $H_2$, 250 mm for $H_3$, 173 mm for $W_1$, 250 mm for $W_2$ and 350 mm for $W_3$.

The remaining parts were as follows:

Adhesive layer 14: OCA (commercially available under the product name "MHM-FWD" manufactured by NICHIEI KAKOH CO., LTD. and having a thickness of 150 µm)

Display panel 104: A substitute, which had polarizing plates (made of TAC or tri-acetate) bonded to both sides of soda-lime glass (having a thickness of 1.1 mm and dimensions of 173 mm×120 mm), was used.

Backlight unit 102: A substitute, which had a concave member 102b (made of aluminum and a thickness of 1 mm) covering a bottom and four sides of a planar body 102a (made of PC or polycarbonate and having a thickness of 4 mm and dimensions of 117 mm×170 mm), was used.

Double-sided tapes 207: made of PET or polyethylene terephthalate and having a width of 5 mm and a thickness of 0.5 mm L-shaped members 208: made of PVC or polyvinyl chloride and having a thickness of 1 mm and a length of 5 mm in the length of an L-shaped side Case frames 109: made of ABS or acrylonitrile-butadiene-styrene copolymer and having a thickness of 2 mm Case end frames 110: made of ABS and having a thickness of 2.5 mm and a width of 5 mm Double-sided tapes 115: made of PET and having a thickness of 0.5 mm Fixing members 301: made of iron (SS400) and having a thickness of 1.0 mm Bolts 311: made of iron Support plate 215: made of iron and having a thickness of 9 mm Case bottom plate 107 and case projections 111: made of iron and having a thickness of 1.15 mm <Head Impact Test>

The fabricated test specimens 200 were used to conduct the head impact test as follows.

The support plate 215 for the test specimens 200 was placed on a horizontal surface, and an unshown spherical rigid model (made of iron and having a diameter of 165 mm and a mass of 19.6 kg) was hit against a hit position P on the second principal surface 12b of each transparent substrate 12 as the cover member (see FIG. 11) at a hitting speed of 3.944 mm per sec from a height of 793 mm. In more detail, the rigid model was hit against the hit position P from an angle of 45 degrees outside. The hit position P was at a location closer to one of the fixing members 301 than the center of each specimen as viewing each specimen 100 from a top surface thereof and 1 mm inward from an outermost edge of each transparent substrate 12.

<Edge Portion Impact Resistance Against Impact from Oblique Direction>

Based on the head impact test, "A" is assigned to cases where the transparent substrates 12 were not cracked, and "B" is assigned to a case where a transparent substrate 12 was cracked in the following Table 1. The cases with "A" assigned thereto are evaluated as being excellent in the edge portion impact resistance against impact from an oblique direction.

<Color of Edge Portion>

With respect to the transparent substrate 12 in each of Ex. 1 to 5, the color of the edge portion including the lateral surface 12c, the first boundary surface $12d_1$ and the third boundary surface $12d_3$ was visually inspected. The wording "transparent" is assigned to cases where the color was transparent, and the wording "cloudy" is assigned to a case where the color is cloudy in the following Table 1.

TABLE 1

|  |  |  | Ex. 1 | Ex. 2 | Ex. 3 | Ex. 4 | Ex. 5 |
|---|---|---|---|---|---|---|---|
| Chamfering process |  |  | CNC | CNC | CNC | CNC | CNC |
| Film laminating process/etching process | Offset amount ($D_1$, $D_2$) |  | 319 μm | 288 μm | 452 μm | — | 400 μm |
|  | Overhang amount ($D_3$, $D_4$) |  | — | — | — | 2,000 μm | — |
|  | Immersion time |  | 19 minutes | 12 minutes | 7 minutes | 19 minutes | 1 minute |
| First boundary surface | Concave portion | Frequency of maximum curvature | 0.1% | 0.2% | 0.7% | 0.5% | 3% |
|  |  | Difference between maximum frequency and intermediate frequency in curvature | 30.1% | 27.2% | 3.5% | 3.3% | 0.5% |
|  |  | Curvature of maximum frequency [$nm^{-1}$] | $1.5 \times 10^{-5}$ | $2 \times 10^{-5}$ | $6 \times 10^{-5}$ | $4.5 \times 10^{-5}$ | $5.3 \times 10^{-5}$ |
|  |  | Average value of curvature [$nm^{-1}$] | $2.1 \times 10^{-5}$ | $2.3 \times 10^{-5}$ | $5.7 \times 10^{-5}$ | $5.6 \times 10^{-5}$ | $7.4 \times 10^{-5}$ |
|  |  | Arithmetic average roughness $Ra_1$ | 3.9 μm | 5.8 μm | 9.3 μm | 8.2 μm | 4 μm |
| Second boundary surface |  | Arithmetic average roughness $Ra_2$ | 0.08 μm | 0.09 μm | 0.05 μm | — | 0.03 μm |
|  |  | Difference between arithmetic average roughnesses ($Ra_1$-$Ra_2$) | 3.82 μm | 5.71 μm | 9.25 μm | — | 3.97 μm |
|  |  | Distance $h_1$ | 47 μm | 31 μm | 11 μm | — | 2 μm |
| Third boundary surface | Concave portion | Frequency of maximum curvature | 0.1% | 0.2% | 0.7% | 0.5% | 3% |
|  |  | Difference between maximum frequency and intermediate frequency in curvature | 30.1% | 27.2% | 3.5% | 3.3% | 0.5% |
|  |  | Curvature of maximum frequency [$nm^{-1}$] | $1.5 \times 10^{-5}$ | $2 \times 10^{-5}$ | $6 \times 10^{-5}$ | $4.5 \times 10^{-5}$ | $5.3 \times 10^{-5}$ |
|  |  | Average value of curvature [$nm^{-1}$] | $2.1 \times 10^{-5}$ | $2.3 \times 10^{-5}$ | $5.7 \times 10^{-5}$ | $5.6 \times 10^{-5}$ | $7.4 \times 10^{-5}$ |
|  |  | Arithmetic average roughness $Ra_3$ | 3.9 μm | 7.7 μm | 8.1 μm | 5.7 μm | 4 μm |
| Fourth boundary surface |  | Arithmetic average roughness $Ra_4$ | 0.09 μm | 0.08 μm | 0.08 μm | — | 0.03 μm |
|  |  | Difference between arithmetic average roughnesses ($Ra_3$-$Ra_4$) | 3.81 μm | 7.62 μm | 8.02 μm | — | 3.97 μm |
|  |  | Distance $h_1$ | 50 μm | 32 μm | 13 μm | — | 2 μm |
| Evaluation |  | End portion impact resistance against impact from oblique direction | A | A | A | A | B |
|  |  | Color of end portion | Transparent | Transparent | Transparent | Transparent | Cloudy |

In Table 1, "-" means a case where no measurement was made, or a non-pertinent case.

As clear from the results shown in Table 1, the transparent substrates 12 in Ex. 1 to 4 were excellent in edge portion impact resistance against impact from an oblique direction.

On the other hand, the transparent substrate 12 in Ex. 5 had poor edge portion impact resistance against impact from an oblique direction.

The entire disclosure of Japanese Patent Application No. 2017-192590 filed on Oct. 12, 2017 including specification, claims, drawings and summary is incorporated herein by reference in its entirety.

What is claimed is:

1. A transparent substrate comprising:
a first principal surface;
a second principal surface as a principal surface on the opposite side of the first principal surface;
a lateral surface extending between the first principal surface and the second principal surface; and
a first boundary surface disposed between the first principal surface and the lateral surface and having a plurality of concave portions;
wherein the first boundary surface is configured such that each of the concave portions has a bottom with a curvature and that a frequency of a maximum curvature is less than 3% in a frequency distribution of the curvatures of the concave portions, and
the first boundary surface is configured such that the difference between a maximum frequency and an intermediate frequency is 1% or more in the frequency distribution of the curvatures of the concave portions.

2. A transparent substrate, comprising:
a first principal surface;
a second principal surface as a principal surface on the opposite side of the first principal surface;
a lateral surface extending between the first principal surface and the second principal surface; and
a first boundary surface disposed between the first principal surface and the lateral surface and having a plurality of concave portions,
wherein the first boundary surface is configured such that each of the concave portions has a bottom with a curvature and that a frequency of a maximum curvature is less than 3% in a frequency distribution of the curvatures of the concave portions, and the first boundary surface is configured such that the maximum frequency has a curvature of $1\times10^{-5}$ to $9.5\times10^{-5}$ nm$^{-1}$ in the frequency distribution of the curvatures of each of the concave portions.

3. The transparent substrate according to claim 1, wherein the first boundary surface has an arithmetic average roughness $Ra_1$ of 3 to 10 μm.

4. The transparent substrate according to claim 2, wherein the first boundary surface is configured such that the difference between a maximum frequency and an intermediate frequency is 1% or more in the frequency distribution of the curvatures of the concave portions.

5. The transparent substrate according to claim 1, further comprising:
a third boundary surface disposed between the second principal surface and the lateral surface and having a plurality of concave portions;
wherein the third boundary surface is configured such that the difference between a maximum frequency and an intermediate frequency is at least 1% in the frequency distribution of the curvatures of each of the concave portions.

6. The transparent substrate according to claim 5, wherein the third boundary surface has an arithmetic average roughness $Ra_3$ of 3 to 10 μm.

7. The transparent substrate according to claim 5, wherein the third boundary surface is configured such that the maximum frequency has a curvature of $1\times10^{-5}$ to $9.5\times10^{-5}$ nm$^{-1}$ in the frequency distribution of the curvatures of the concave portions.

8. A transparent substrate, comprising:
a first principal surface;
a second principal surface as a principal surface on the opposite side of the first principal surface;
a lateral surface extending between the first principal surface and the second principal surface;
a first boundary surface disposed between the first principal surface and the lateral surface and having a plurality of concave portions; and
a second boundary surface disposed between the first principal surface and the first boundary surface,
wherein the first boundary surface is configured such that each of the concave portions has a bottom with a curvature and that a frequency of a maximum curvature is less than 3% in a frequency distribution of the curvatures of the concave portions, and
an arithmetic average roughness $Ra_2$ of the second principal surface is smaller than an arithmetic average roughness $Ra_1$ of the first boundary surface.

9. The transparent substrate according to claim 8, wherein the arithmetic average roughness $Ra_2$ of the second boundary surface is 0.02 to 0.15 μm.

10. The transparent substrate according to claim 8, wherein the first principal surface is apart from a junction between the first boundary surface and the second boundary surface by a distance $h_1$ of longer than 0 μm and not longer than 80 μm in a thickness direction of the transparent substrate.

11. The transparent substrate according to claim 5, further comprising a fourth boundary surface disposed between the second principal surface and the third boundary surface;
wherein an arithmetic average roughness $Ra_4$ of the fourth boundary surface is smaller than an arithmetic average roughness $Ra_3$ of the third boundary surface.

12. The transparent substrate according to claim 11, wherein the arithmetic average roughness $Ra_4$ of the fourth boundary surface is 0.02 to 0.15 μm.

13. The transparent substrate according to claim 11, wherein the second principal surface is apart from a joint between the third boundary surface and the fourth boundary surface by a distance $h_2$ of longer than 0 μm and not longer than 80 μm in the thickness direction of the transparent substrate.

14. A display device comprising:
the transparent substrate recited in claim 1;
a display panel covered by the transparent substrate; and
a case for housing the display panel;
wherein the transparent substrate is disposed in such a direction that the first principal surface confronts a display surface of the display panel.

15. The transparent substrate according to claim 2, further comprising:
a third boundary surface disposed between the second principal surface and the lateral surface and having a plurality of concave portions;
wherein the third boundary surface is configured such that the difference between a maximum frequency and an intermediate frequency is at least 1% in the frequency distribution of the curvatures of each of the concave portions.

16. The transparent substrate according to claim 15, wherein the third boundary surface has an arithmetic average roughness $Ra_3$ of 3 to 10 μm.

17. The transparent substrate according to claim 15, wherein the third boundary surface is configured such that the maximum frequency has a curvature of $1\times10^{-5}$ to $9.5\times10^{-5}$ nm$^{-1}$ in the frequency distribution of the curvatures of the concave portions.

18. The transparent substrate according to claim 8, further comprising:
a third boundary surface disposed between the second principal surface and the lateral surface and having a plurality of concave portions;
wherein the third boundary surface is configured such that the difference between a maximum frequency and an intermediate frequency is at least 1% in the frequency distribution of the curvatures of each of the concave portions.

19. The transparent substrate according to claim 18, wherein the third boundary surface has an arithmetic average roughness $Ra_3$ of 3 to 10 μm.

20. The transparent substrate according to claim 18, wherein the third boundary surface is configured such that the maximum frequency has a curvature of $1\times10^{-5}$ to $9.5\times10^{-5}$ nm$^{-1}$ in the frequency distribution of the curvatures of the concave portions.

* * * * *